United States Patent [19]

Yoshida

[11] Patent Number: 4,885,755
[45] Date of Patent: Dec. 5, 1989

[54] METHOD AND APPARATUS FOR DATA COMMUNICATION

[75] Inventor: Takehiro Yoshida, Tokyo, Japan

[73] Assignee: Canon Kabushiki Kaisha, Tokyo, Japan

[21] Appl. No.: 847,684

[22] Filed: Apr. 3, 1986

[30] Foreign Application Priority Data

| Apr. 10, 1985 | [JP] | Japan | 60-75938 |
| Apr. 10, 1985 | [JP] | Japan | 60-75939 |
| Apr. 17, 1985 | [JP] | Japan | 60-81841 |

[51] Int. Cl.$^4$ ............................................. H04B 15/00
[52] U.S. Cl. ........................................ 375/58; 370/24; 379/407
[58] Field of Search ................ 375/7, 8, 10, 58; 371/35; 379/406, 407, 409, 410; 370/84, 24, 31

[56] References Cited

U.S. PATENT DOCUMENTS

| 3,646,518 | 2/1972 | Weinstein | 371/35 |
| 3,700,810 | 10/1972 | Richeson et al. | 379/407 |
| 3,783,194 | 1/1974 | Vilips et al. | 379/407 |
| 3,843,834 | 10/1974 | Burke | 370/31 |
| 3,956,589 | 5/1976 | Weathers et al. | 370/31 |
| 3,979,559 | 7/1976 | Roedel et al. | 379/407 |
| 3,995,111 | 11/1976 | Tsuji et al. | 375/109 |
| 4,079,188 | 3/1978 | Kinch, Jr. et al. | 370/31 |
| 4,214,123 | 7/1980 | Dagnelie | 370/31 |
| 4,425,664 | 1/1984 | Sherman et al. | 375/8 |
| 4,469,916 | 9/1984 | de Bergh et al. | 379/406 |
| 4,628,156 | 12/1986 | Irvin | 379/410 |
| 4,644,108 | 2/1987 | Crouse et al. | 379/406 |
| 4,677,660 | 6/1987 | Yoshida | 379/100 |
| 4,727,576 | 2/1988 | Yoshida | 358/257 |
| 4,729,033 | 3/1988 | Yoshida | 358/257 |

FOREIGN PATENT DOCUMENTS

0069595 1/1983 European Pat. Off. .

Primary Examiner—Robert L. Griffin
Assistant Examiner—Stephen Chin
Attorney, Agent, or Firm—Fitzpatrick, Cella, Harper & Scinto

[57] ABSTRACT

A data communication method includes the steps of: sending a communication procedure signal prior to data communication; sending a data signal; and sending a stop signal for stopping an echo suppressor function on a communication network; wherein the stop signal is sent prior to the data signal in such a way that a time interval during which no signal is generated does not occur, after the stop signal is sent, until the data signal is sent. A data communication apparatus includes: a communication unit for sending and receiving a data signal; a discrimination unit for discriminating if the apparatus is a calling station; and a control unit for controlling to change a communication controlling mode based on the output from the discrimination unit.

15 Claims, 8 Drawing Sheets

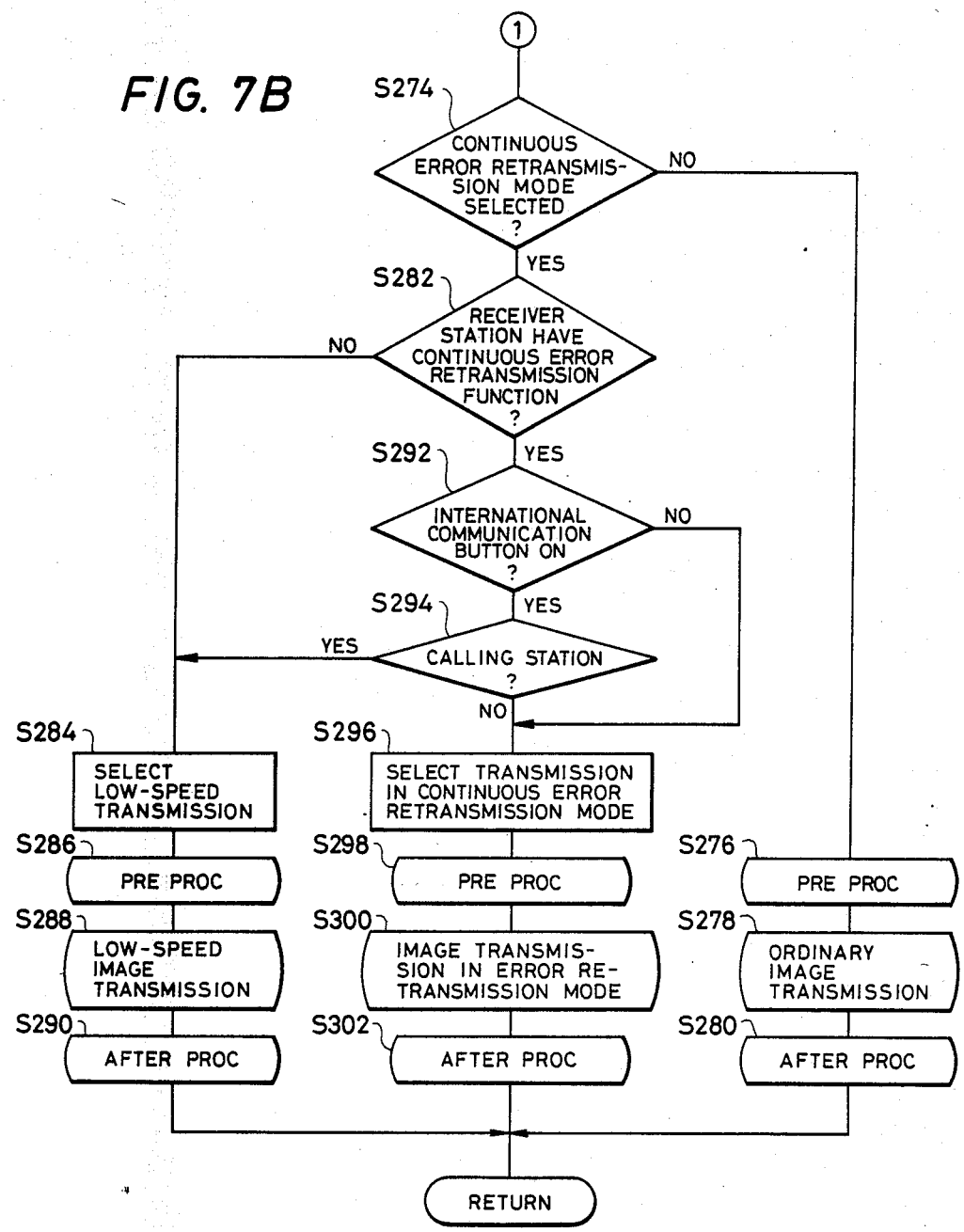

METHOD AND APPARATUS FOR DATA COMMUNICATION

BACKGROUND OF THE INVENTION

1. Field of the Invention

The present invention relates to a method and apparatus for data communication for sending and receiving data such as character code data, image data or the like via a communication network, particularly suitable for application to data transmission via an international communication network.

2. Related Background Art

Among types of data communication apparatus, facsimile apparatus for example are known for sending and receiving image information. In a case where a conventional facsimile apparatus calls a receiving station in an automatic sending mode, it is possible for the facsimile apparatus to perform necessary procedures by confirming by itself that the apparatus operates as a calling station. However, for the case that a call is made by a telephone set prior to sending image information with the facsimile apparatus, a conventional facsimile apparatus is not constructed in such a way that it can confirm or detect by itself that it is operating as a calling station.

Alternatively, in the case where a conventional facsimile apparatus is previously set in an automatic receiving mode, it is possible for the facsimile apparatus to perform necessary procedures by confirming by itself that the apparatus operates as a receiving station. However, for the case that the facsimile apparatus is set in a manual receiving mode, a conventional facsimile apparatus is not constructed in such a way that it can confirm to detect by itself that it is operating as a receiving station. In this case, only an audible ringing of the telephone is generated.

By transmitting an echo suppressor function termination tone to a receiving station prior to commencing necessary data communication over an international communication network, it is possible to send a control signal from a called station to a calling station during data transmission from the calling station to the called station (i.e., so-called full duplex operation).

However, on the contrary, a full duplex operation cannot be achieved even if a control signal is sent from a calling station to a called station during data transmission from the called station to the calling station, even if an echo suppressor function termination tone was sent prior to commencing international communication. Therefore, if a "continuous error retransmission" is intended in the latter case (during data transmission from a called station to a calling station), the image information sending station cannot detect a control signal (e.g., a NACK signal which is sent when a reception error occurs) and data communication becomes impossible. This is a serious disadvantage associated with a conventional facsimile apparatus.

The "continuous error retransmission" here mentioned means an error retransmission system in a full duplex operation. More in detail, according to such system, when an error is detected at a receiving station during transmission of image information from a sending station, the receiving station sends a NACK signal to the sending station to suspend transmission of image information. Thereafter, the image information is retransmitted starting from for example the address frame line where the error was generated.

In the case of the facsimile apparatus, for example, the echo suppressor function is stopped upon sending a called station identification signal (CED) to use the telephone network in a full duplex mode. However, even if the echo suppressor function is stopped, this stoppage is released if, for a period longer than a predetermined time interval, signals are not being sent.

For instance, if it takes a long time for the operator at a sending station to depress a sending start button after hearing a CED signal, response signals NSS/TSI/DCS cannot be sent from the sending station in response to first, initial identification signals NSF/CSI/DIS sent from the receiving station. Consequently, the receiving station must send the initial identification signals once again. However, since signals are not being sent for the relatively long period between the first and second initial identification signals, the stoppage of the echo suppressor function is released.

In addition, if a receiving station cannot receive signals of DCS group, or page interruption signals such as EOP, MPS, EOM or the like, the stoppage of the echo suppressor function is also released in this case.

Releasing the stoppage of the echo suppressor function makes it impossible to communicate in a full duplex mode. Accordingly, the continuous error retransmission using the network in a full duplex mode becomes also impossible.

SUMMARY OF THE INVENTION

It is an object of the present invention to provide a method and apparatus eliminating the abovedescribed problems.

It is another object of the present invention to provide a data communication system which can stop the echo suppressor function without failure during data communication.

It is a further object of the present invention to provide a communication apparatus which can control data communication without any hindrance, by discriminating beforehand if the communication apparatus is a calling station or not. To achieve this object, the communication apparatus for sending and receiving data via a communication network is provided with calling station discrimination means for discriminating at the start of communication if the communication apparatus concerned is a calling station.

It is a still further object of the present invention to provide a communication apparatus which can control data communication without any hindrance, by discriminating beforehand if the communication apparatus is a called station or not. To achieve this object, the communication apparatus for sending and receiving data via a communication network is provided with called station discrimination means for discriminating at the start of communication if the communication apparatus concerned is a called station.

BRIEF DESCRIPTION OF THE DRAWINGS

FIGS. 7A and 7B are flow charts showing the control procedure of the control circuit 240 of FIG. 6.

DETAILED DESCRIPTION OF THE PREFERRED EMBODIMENTS

A first embodiment of the present invention will now be described with reference to the accompanying drawings.

Figure 1:
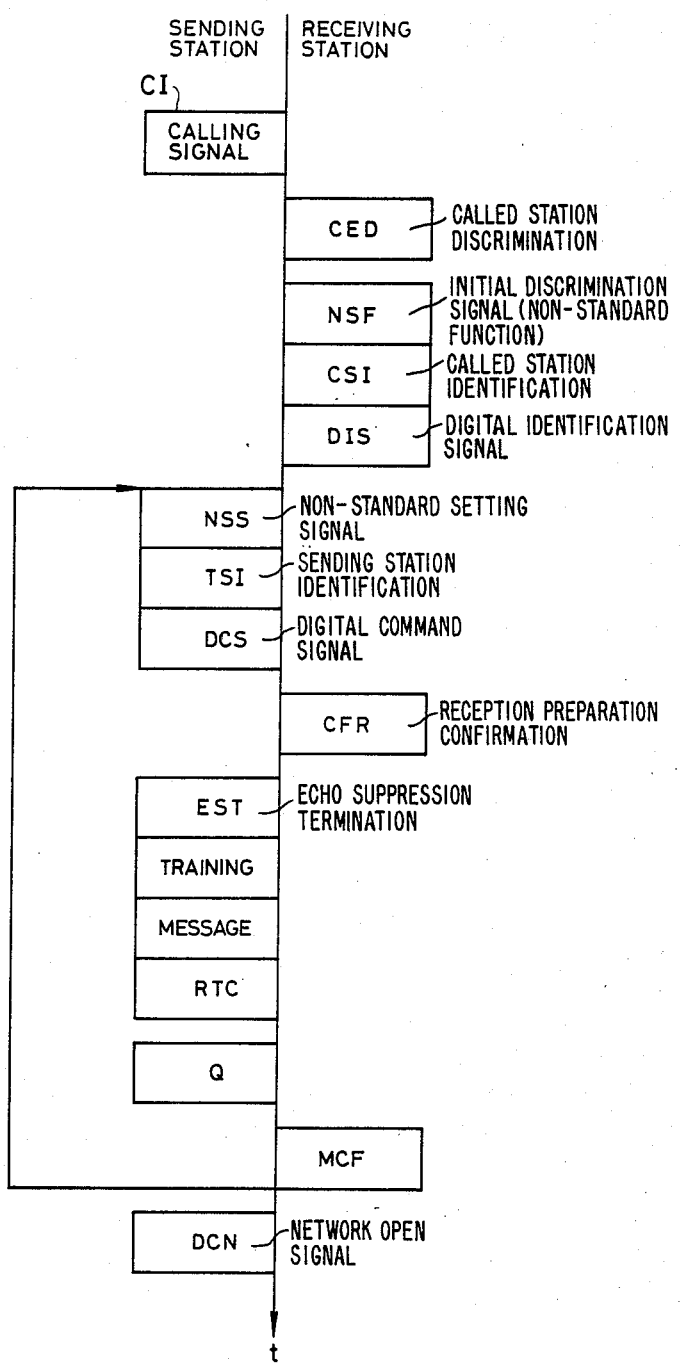
FIG. 1 schematically shows the output timings of signals at the sending and receiving stations according to a first embodiment of the communication system of the present invention.

FIG. 1 shows the output timings of output signals at the sending and receiving stations in the embodiment of a facsimile communication system constructed according to the present invention.

First, upon reception of a calling signal CI from the sending station, the receiving station outputs a called station discrimination signal CED. Thereafter, the receiving station sends an initial discrimination signal NSF indicative of a non-standard function to notify the sending station as to whether a continuous error retransmission function is provided at the receiving station. This is done for example by setting one of the bits, for example, the 50th bit in facsimile information field NSF FIF at 1 for the presence of the error retransmission function and at 0 for the absence of that function. The receiving station also sends a called station identification binary signal CSI and a digital identification signal DIS.

On the side of the sending station, it is judged if the operator has selected the error retransmission function and if the receiving station has that function. If the operator has selected the error retransmission function and if the receiving station has this function, then the 50th bit in FIF of a nonstandard facsimile setting signal NSS is set at 1 to send it to the receiving station. The sending station also sends a sending station identification signal TSI and a digital command signal DCS. The receiving station can judge based on the signal NSS if the error retransmission function can be used.

Upon reception of a reception preparation confirmation signal CFR from the receiving station, the sending station sends, if the error retransmission function is to be used, a tonal signal of 2100 Hz for 1 sec as an echo suppressor function termination tone EST. Thereafter, no signals are sent, for a period shorter than 100 ms (or some lesser limit), or without sending any signals, the sending station sends a training signal and a message (image) signal. Consequently, it is possible to use the network in a full duplex mode during transmission of the message. Thus, even if a part of the image signals cannot be received at the receiving station during message transmission, the continuous error retransmission system can operate to retransmit the error portion.

After completion of one-page transmission, if there is a next page, a signal NSS is again sent. Also in this case, it is noted that a signal EST prior to sending a training signal and a following message signal is sent to the receiving station. After the end of transmission of all the pages, the sending station sends a network open signal DCN to complete the communication.

Figure 2:
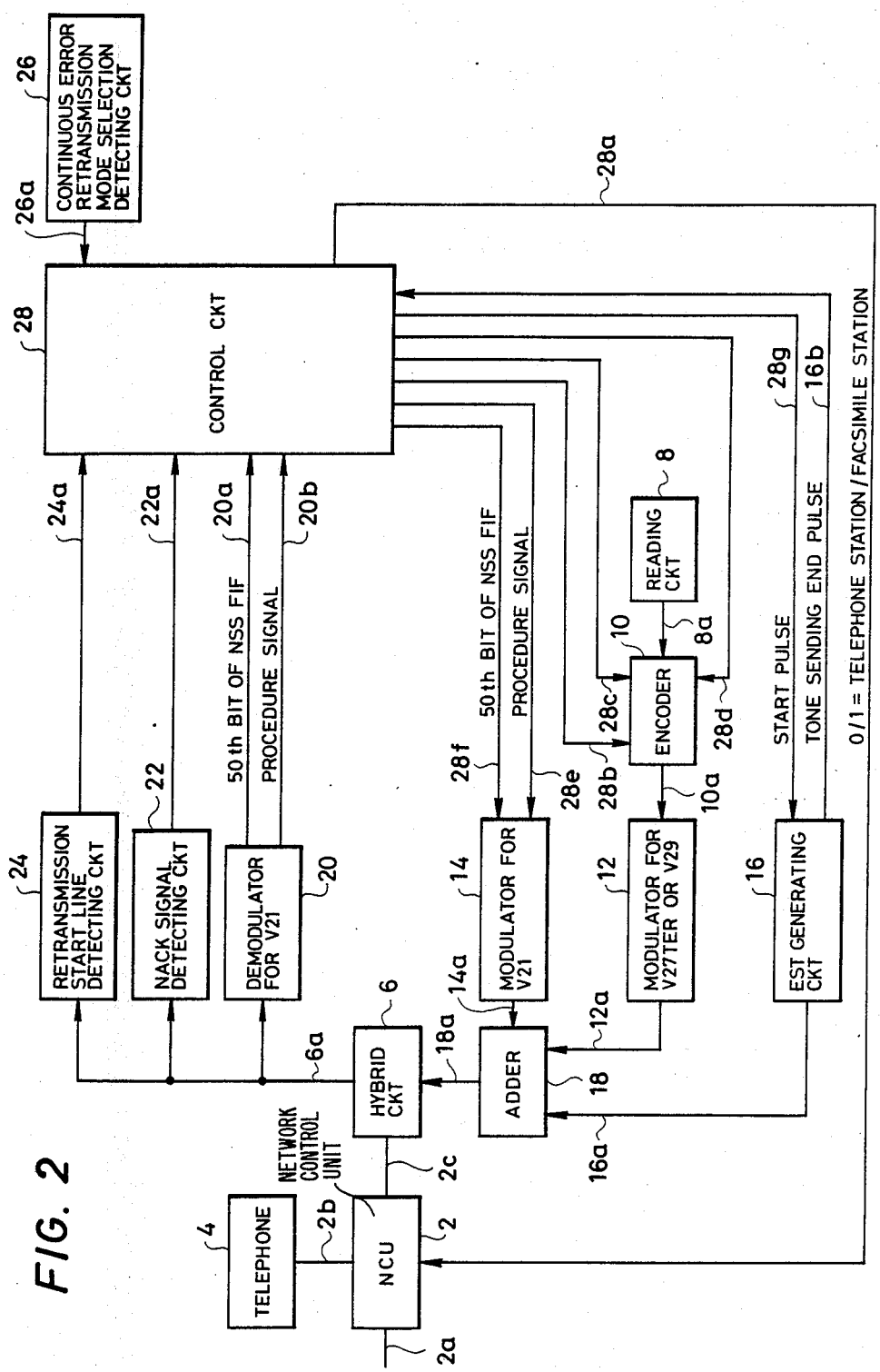
FIG. 2 is a circuit block diagram showing an embodiment of the facsimile transmitter o the first embodiment.

An embodiment of a facsimile transmitter performing the procedures of FIG. 1 is shown in FIG. 2 in the form of a block diagram.

Referring now to FIG. 2, network control unit NCU 2 controls to connect a telephone station to a telephone network, connect a data communication path to the telephone network for using it as data communication, or hold a loop. Signal line 2a represents a telephone line. NCU 2 is inputted with a signal from signal line 28a and connects the telephone line to the telephone station, i.e., connects signal line 2a to signal line 2b, on condition that signal level "0" is inputted from signal line 28a. On the contrary if signal level "1" is inputted from signal line 28a, NCU 2 connects the telephone line to the facsimile station, i.e., connects signal line 2a to signal line 2c. In an ordinary state, the telephone line is maintained connected to the telephone station. Reference numeral 4 represents a telephone set. A hybrid circuit 6 performs separation between sending signals and receiving signals. In particular, sending signals on signal line 18a are sent to the telephone network via signal line 2c and NCU 2. Receiving signals are delivered onto signal line 6a via NCU 2 and signal line 2c. A reading circuit 8 sequentially reads from an original to be transmitted one-line image signals in the main scan direction and generates a signal train made up of binary signals of white and black. The reading circuit 8 is constructed of an image sensor such as a charge-coupled device and an optical system. The signal train binarized as of white and black is outputted to signal line 8a.

An encoder 10 is inputted with binarized data from signal line 8a and encodes it. The encoder 10 has a memory whose capacity is sufficient for retransmission purposes. The encoder 10 encodes the binarized data so as to be suitable for ordinary transmission in the case that signal level "0" is inputted from signal line 28d, while on the other hand it encodes the binarized data so as to be suitable for continuous error retransmission in the case that signal level "1" is inputted from signal line 28d. During the continuous error retransmission mode, the following control is performed. When signal line 28b takes signal level "1", image transmission is interrupted. If signal line 28b becomes signal level "0", information at the retransmission start line outputted onto signal line 28c is inputted to the encoder circuit 10 which in turn retransmits information starting from the start line. Data subjected to MH (Modified Huffman) encoding or MR (Modified Read) encoding is outputted onto signal line 10a.

A modulator 12 performs modulation in conformity with known CCITT Recommendation V27 ter (differential phase modulation) or V29 (orthogonal modulation). The modulator 12 is inputted with a signal from signal line 10a and modulates it to output modulated data onto signal line 12a. A modulator 14 performs modulation in conformity with known CCITT V21, which is inputted with a procedure signal from signal line 28e and modulates it to output modulated data onto signal line 14a. Information of the 50th bit in NSS FIT is outputted onto signal line 28f. An echo suppressor function termination tone generating circuit or EST generating circuit 16 generates a signal EST when a pulse appears on signal line 28g. In this embodiment, as a signal EST, a signal of 2100 Hz continues to be sent for one second. The EST generating circuit 16 generates a pulse onto signal line 16b when delivery of a signal ESP is completed. An adder 18 is inputted with signals from signal lines 12a, 14b and 16a and outputs the added result onto signal line 18a. A demodulator 20 performs demodulation in conformity with known CCITT Recommendation V21, which is inputted with a signal from signal line 6a and V21-demodulates it to output a demodulated signal onto signal line 20b. The demodulator 20 also outputs information on the 50th bit in NSS FIF onto signal line 20a.

The receiving station outputs a signal NACK onto signal line 6a when the station detects a reception error. A NACK signal detecting circuit 22 generates a pulse onto signal line 22a when signal NACK is detected. A retransmission start line detecting circuit 24 detects the retransmission start line number to be sent following a signal NACK, and outputs the line number onto signal line 24a. A continuous error retransmission mode selection detecting circuit 26 detects if the operator has selected the retransmission mode. The circuit 26 outputs signal level "0" onto signal line 26a in the case that the operator has not selected the continuous error retransmission mode. On the contrary, if the operator has selected the retransmission mode, the circuit 26 outputs signal level "1" onto signal line 26a.

A control circuit 28 performs the following controls. In the case where the operator at the sending station has not selected the continuous error retransmission mode as yet or the receiving station has no continuous error retransmission function, an ordinary transmission is carried out. In this case, a signal EST is not sent immediately before the image signal is sent. In case where the receiving station has the continuous error retransmission function and the operator at the sending station has selected the retransmission mode, transmission is carried out under the continuous error retransmission mode. In this case, a signal EST is sent immediately before the image signal is sent. When a retransmission is intended, signal EST is again sent immediately before the image signal is sent. Thus, a full duplex operation becomes possible even over an international communication network. The control circuit 28 is constructed of such as a CPU, ROM, RAM and the like.

Figure 3:
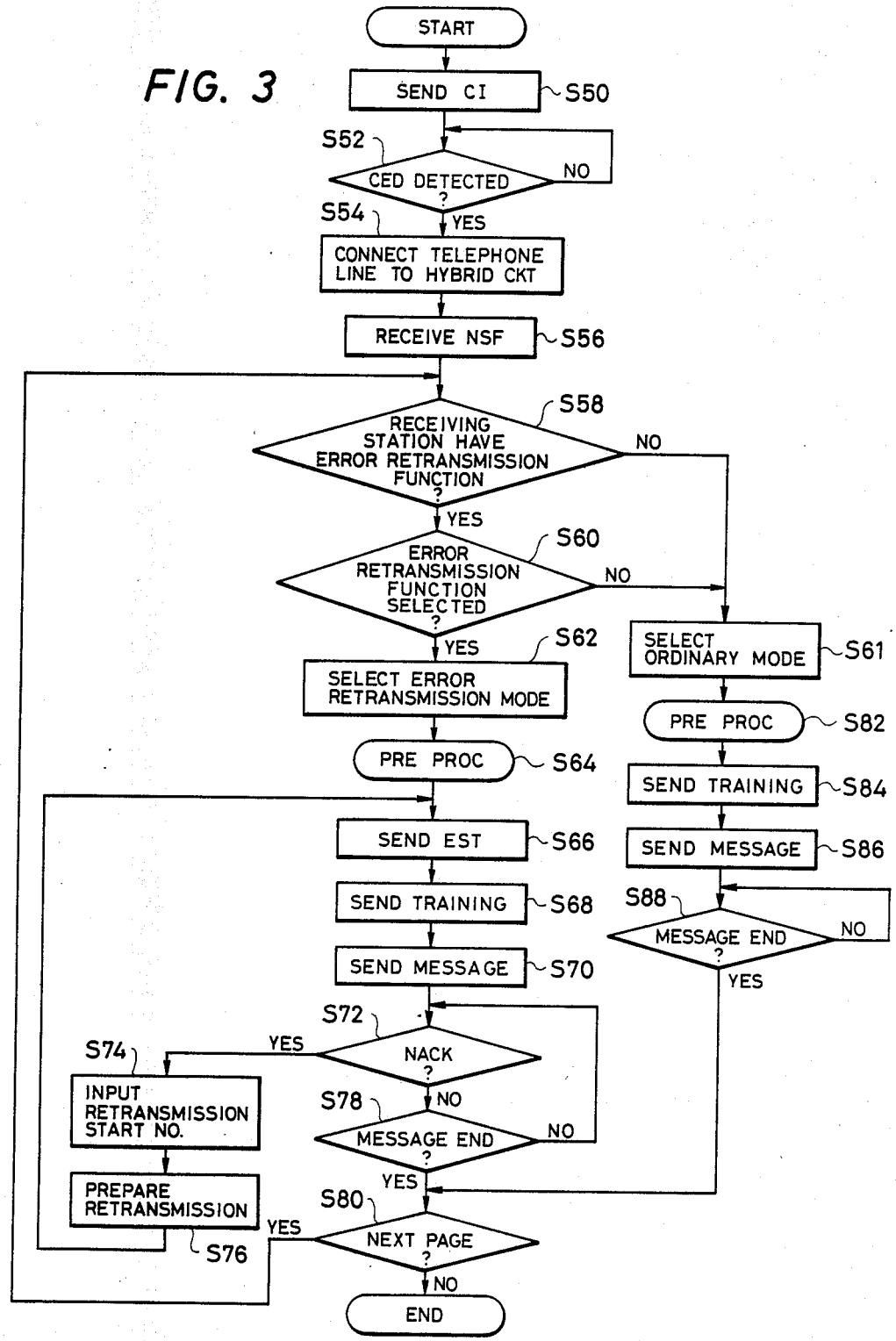
FIG. 3 is a control flow chart for the control circuit shown in FIG. 2.

In FIG. 3, a flow chart for the control procedure of the control circuit 28 of FIG. 2 is shown. The content of this flow chart is stored in the ROM of the control circuit 28.

Referring now to FIG. 3, the telephone network is connected to the telephone station at step S50 to send a calling signal CI. If the start button is depressed after detection of a signal CED at step S52, then the telephone network is connected to the hybrid circuit at step S54.

At step S56 a signal NSF from the receiving station is received to judge at step S58 if the receiving station has the continuous error retransmission function. If present, it is checked at step S60 if the operator has selected the retransmission function. If not present at any one of steps S58 and S60, then a normal mode is selected at step S61 to output signal level "0" onto signal lines 28b, 28d and 28f.

On the other hand, if present at both steps S58 and S60, then the continuous error retransmission mode is selected to output signal level "0" onto signal lines 28b, 28d and 28f.

Thus, a signal NSS, i.e., "1" at the 50th bit in FIF is sent at the pre-procedure at step S64. Upon detection of signal CFR (Confirmation to Receive) at the pre-procedure at step S64, an echo suppressor function termination tone signal EST is sent at step S66 and thereafter, with no signals being sent for a period shorter than 100 ms or less or without any signals being sent, a training signal and a message (image) signal are sent at steps S68 and S70.

Consequently, the communication network is always used in a full duplex mode during message transmission in the continuous error retransmission mode. If a signal NACK is received from the receiving station during message transmission, a retransmission start line number signal following the signal NACK is detected at step S74. After preparation of retransmission at step S76, step S66 resumes to sequentially send a signal EST, training and message signals.

Upon detection of the end of one-page message at step S78, it is judged at step S80 if a next page is present or not. If present, step S58 resumes to repeat the above operations. If not present, a signal DCN is sent to complete the operations.

In case where an ordinary mode is selected at step S61, then a signal NSS, i.e., "0" at the 50th bit in FIF is sent at the pre-procedure at step S82 and thereafter, the ordinary mode proceeds without sending a signal EST.

As described in the foregoing, the facsimile apparatus of this embodiment always sends, in a continuous error retransmission mode, a signal EST immediately before image signal data is transmitted. Therefore, even if signals are not being sent for a period longer than 100 ms or more during the procedure, the communication network can always be used in a full duplex mode during practical data communication.

This is very advantageous for international or remote communication wherein, generally, a long time is required in transmitting information and the network quality is not always good.

In the above embodiment, although a signal EST is sent immediately before the training signal which is sent prior to the image signal, it is also possible to send a signal EST before the image signal which includes signals not being sent for a period longer than 100 ms or more.

As seen from the foregoing description of the first embodiment, even if signals are not being sent during a communication procedure, the communication network can always be used in a full duplex mode during practical data communication, reliably performing a continuous error retransmission operation. It is advantageous particularly for international or remote communication where absence of signals to be sent during the procedure is likely to occur.

Next, a second embodiment of the present invention will be described.

First, a brief description of the operation will be given wherein the receiving station is provided with the continuous error retransmission function, the operator at the sending station has selected the retransmission mode, and the start button for international communication has been depressed.

In such a state, the sending station confirms by itself as to whether the sending station is a calling station or a called station, with the aid of calling station identification means to be described later in detail. In the case that the sending station is a calling station, transmission of image information is performed in the continuous error retransmission mode. Declaration for transmission in the continuous error retransmission mode is effected by a signal NSS. Alternatively, in the case that the sending station is a called station, low speed transmission of image information is initiated. Declaration for this low speed transmission is effected by a signal DCS.

If the operator at the sending station has not selected the continuous error retransmission mode, a normal transmission of image information is performed. It is irrelevant in this case whether the receiving station is provided with the continuous error retransmission function and whether the operator at the sending station has depressed the start button for international communication.

In the case that, although the operator at the sending station has selected the continuous error retransmission mode, the receiving station is not provided with the continuous error retransmission function, low speed transmission of image information is initiated. It is not relevant in this case whether the operator at the sending station has depressed the start button for international communication.

In the case that the receiving station is provided with the continuous error retransmission function and the operator at the sending station has selected the retransmission mode but not depressed the start button for international communication, transmission in the continuous error retransmission mode is performed.

The construction and operation of a second embodiment of the facsimile apparatus will be described in detail in the following.

Figure 4:
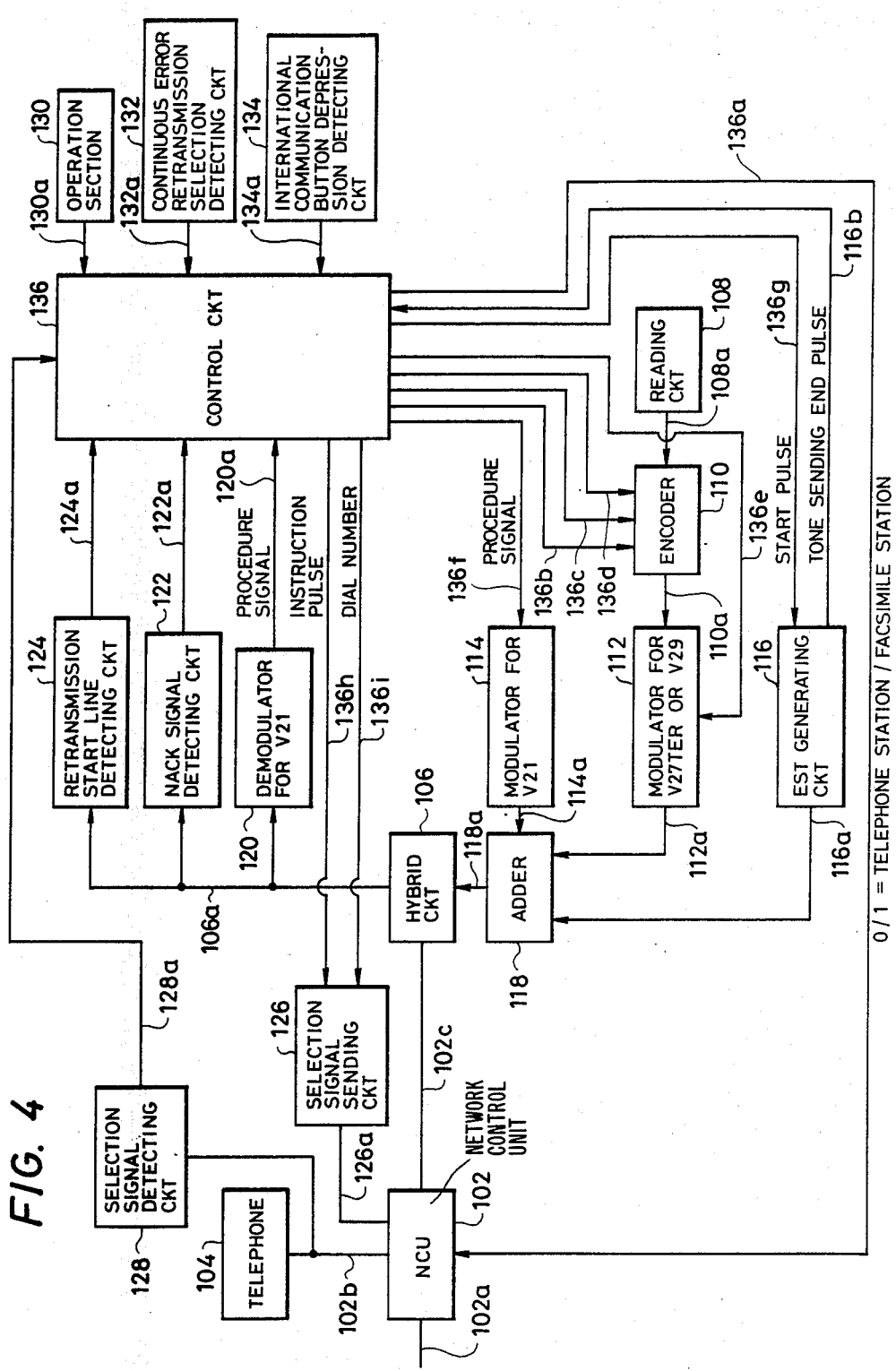
FIG. 4 is a block diagram showing a second embodiment of the facsimile apparatus to which the present invention is applied.

Referring now to FIG. 4, network control unit NCU 102 controls to connect a telephone station to a telephone network, connect a data communication path to the telephone network for using it as data communication, or hold a loop. Signal line 102a represents a telephone line. NCU 102 is inputted with a signal from signal line 136a and connects the telephone line to the telephone station, i.e., connects signal line 102a to signal line 102b, on condition that signal level "0" is inputted from signal line 136a. On the contrary if signal level "1" is inputted from signal line 136a, NCU 102 connects the telephone line to the facsimile station, i.e., connects signal line 102a to signal line 102c. In an ordinary state, the telephone line is maintained connected to the telephone station. Reference numeral 104 represents a telephone set.

A hybrid circuit 106 performs separation between sending signals and receiving signals. In particular, sending signals on signal line 118a are send to the telephone network via signal line 102c and NCU 102. Receiving signals are delivered onto signal line 106a via NCU 102 and signal line 102c.

A reading circuit 108 sequentially reads from an original to be transmitted one-line image signals in the main scan direction and generates a signal train made of binary signals of white and black. The reading circuit 108 is constructed of an image sensor such as a charge-coupled device (CCD) and an optical system. The signal train binarized as of white and black is outputted to signal line 108a.

An encoder 110 is inputted with binarized data from signal line 108a and encodes it. The encoder 110 has a memory whose capacity is sufficient for retransmission purpose. The encoder 110 encodes the binarized data so as to be suitable for ordinary transmission in case that signal level "0" is inputted from signal line 136d, while on the other hand it encodes the binarized data so as to be suitable for continuous error retransmission in case that signal level "1" is inputted from signal line 136d. During the continuous error retransmission mode, the following control is performed. When signal line 136b takes signal level "1", image transmission is interrupted. If signal line 136b becomes signal level "0", information at the retransmission start line outputted onto signal line 136c is inputted to the encoder circuit 110 which in turn retransmits information starting from the start line. Data subjected to MH (Modified Huffman) encoding, MR (Modified Read) encoding or error retransmission encoding is outputted onto signal line 110a.

A modulator 112 performs modulation in conformity with known CCITT Recommendation V27 ter (differential phase modulation) or V28 (orthogonal modualtion). The modulator 112 is inputted with a signal from signal line 110a and modulates it to output modulated data onto signal line 112a. If signal line 136e is signal level "0", high speed transmission of modulated data is performed for example at 9600 bit/sec of V29. Alternatively if signal line 136e is signal level "1", low speed transmission of modulated data is performed for example at 4800 bit/sec of V27 ter.

A modulator 114 performs modulation in conformity with known CCITT Recommendation V21, which is inputted with a procedure signal from signal line 136f and modulates it to output modulated data onto signal line 114a.

An echo suppressor function termination tone generating circuit or EST generating circuit 116 generates a signal EST onto signal line 116a when a pulse appears on signal line 136g. In this embodiment, as a signal EST, a signal of 2100 Hz continuous to be sent for one second. The EST generating circuit 116 generates a tone delivery end pulse onto signal line 116b when delivery of a signal ESP is completed. An adder 118 is inputted with signals from signal lines 112a, 114b and 116a and outputs the added result onto signal line 118a.

A demodulator 120 performs demodulation in conformity with known CCITT Recommendation V21, which is inputted with a signal from signal line 106a and V21-demodulates it to output a demodulated signal onto signal line 120a.

The receiving station outputs a signal NACK onto signal line 106a when the station detects a reception error. A NACK signal detecting circuit 122 generates a pulse onto signal line 122a when signal NACK is detected.

A retransmission start line detecting circuit 124 detects the retransmission start line number to be sent following a signal NACK, and outputs the line number onto signal line 124a.

A selection signal sending circuit 126 is inputted with dial number information outputted on signal line 136i when a pulse is generated onto signal line 136h, to thereby send a selection signal onto signal line 126a. The dial number is given by an operation section 130 to be described later. Input methods for the dial number from the operation section 130 are such as one-touch dialing method, shortened dialing method, dialing method using numerical keys or the like. As the selection signal, a DC impulse or push-button dial signal may be used.

A selection signal detection circuit 128 is inputted with a signal from signal line 102b to detect if a selection signal is inputted from the telephone station. As the selection signal, a DC impulse signal or push-button dial signal may be used. When a selection signal is sent from the telephone station, the selection signal detecting circuit 128 outputs a signal of level "1" onto signal line 128a. When the network becomes open, the selection signal detecting circuit 128 outputs a signal of level "0" onto signal line 128a. When a selection signal is sent from the telephone station or when a selection signal is sent from the selection signal sending circuit 126, and the facsimile apparatus is connected to the network, then it is confirmed that the facsimile apparatus is at a calling station.

The operation section 130 includes such as a start key, mode setting key, numerical keys, alphabetical keys, one-touch keys, and the like. The information signal inputted from the operation section 130 is outputted onto signal line 130a.

A continuous error retransmission selection detecting circuit 132 detects if the operator has selected the retransmission mode. The circuit 132 outputs signal level "0" onto signal line 132a in case that the operator does not select as yet the continuous error retransmission mode. On the contrary, if the operator selects the retransmission mode, the circuit 132 outputs signal level "1" onto signal line 132a.

An international communication button depression detecting circuit 134 detects if the operator has depressed the button. The circuit 134 outputs a signal of the level "0" onto signal line 134a in case that the button is not depressed as yet. On the contrary, if the button is depressed by the operator, the circuit 134 outputs a signal of level "1" onto signal line 134a.

A control circuit 136 performs the following controls. The description is made assuming that a calling is received and a connection for facsimile transmission has been established.

In case that the receiving station is provided with the continuous error retransmission function, and that the operator at the sending station has selected the retransmission mode and has depressed the start button for international communication, the sending station discriminates if it is a calling station or a called station. If it is a calling station, transmission in the continuous error retransmission mode is performed. Alternatively, if it is a called station, low speed transmission of image information is initiated.

If the operator at the sending station has not selected the continuous error retransmission mode, a normal transmission of image information is performed. it is not concerned at all in this case whether the receiving station is provided with the continuous error retransmission function and whether the operator at the sending station has depressed the start button for international communication.

In case that although the operator at the sending station has selected the continuous error retransmission mode, the receiving station is not provided with the continuous error retransmission function, low speed transmission of image information is initiated. It is not concerned at all in this case whether the operator at the sending station has depressed the start button for international communication.

In case that the receiving station is provided with the continuous error retransmission function and that the operator at the sending station has selected the retransmission mode but not depressed the start button for international communication, transmission in the continuous error retransmission mode is performed.

Declaration for transmission of image information in the continuous error retransmission mode is effected by a signal NSS, while declaration for low speed transmission of image information is effected by a signal DCS. The control circuit 136 is constructed of such as a CPU, ROM, RAM and the like.

Figure 5:
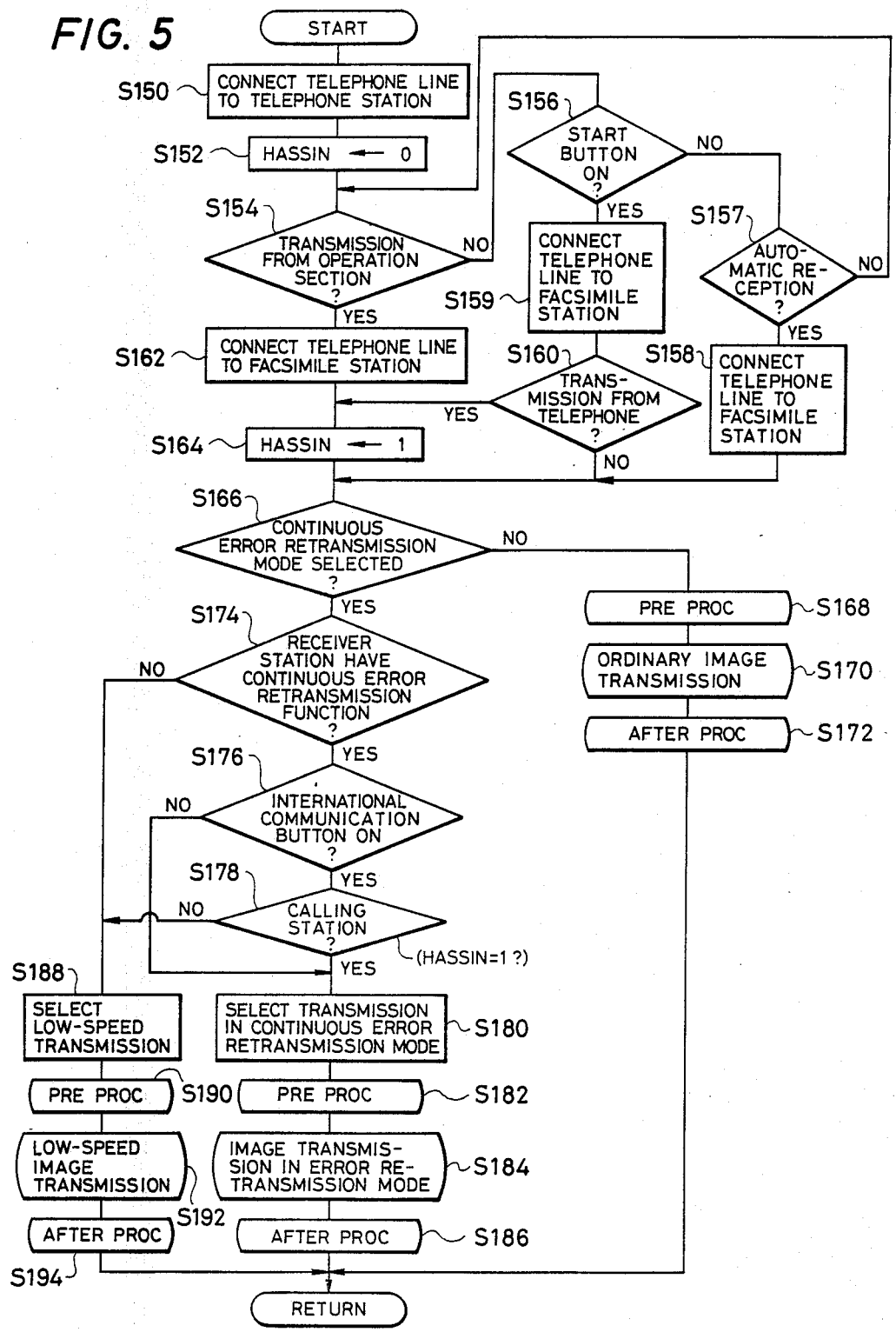
FIG. 5 is a flow chart showing the control procedure of the control circuit of FIG. 4.

In FIG. 5, a flow chart for the control procedure of the control circuit 136 of FIG. 4 is shown. The content of this flow chart is stored in the ROM of the control circuit 136.

Referring now to FIG. 5, the telephone network is connected to the telephone station at step S150. That is, a signal of level "0" is outputted onto signal line 136a.

From step S152 to step S164, if it is judged as a sending station at the auto/manual network connection, "1" is set at a flag HASSIN. If it is judged as a receiving station, "0" is set at the flag HASSIN.

That is, the actuation requirements of the facsimile apparatus is checked at steps S154, S156 and S158 by setting at step S152 "0" at the flag HASSIN. Setting at step S164 "1" at the flag HASSIN is conducted in a case where a calling is made from the operation unit (the control circuit 136 is inputted with a dial number from signal line 130a and a selection signal is sent from the selection signal sending circuit 126), or in a case where the start button has been depressed after a calling is made from the telephone station. Setting of the flag HASSIN is not performed at the other actuation requirements, i.e., when an automatic reception is effected or when the start button is depressed after a manual reception is effected.

The characteristic feature of this embodiment resides in that even at the manual mode operation (i.e., the start button is depressed after the network is connected using the telephone station), the facsimile apparatus concerned discriminates if it is a sending station or a receiving station. This discrimination is conducted by the selection signal detecting circuit 128 (corresponding to the judgement at step S160). That is, at step S160 the control circuit 136 is inputted with a signal from signal line 128a and judges, in case the signal is at level "1", that a calling from the telephone station was effected.

After actuation based on one of the various actuation requirements, the telephone network is connected to the facsimile apparatus (steps S158, S159, S162). Control for this connection is conducted by outputting a signal of signal level "1" onto signal line 136a.

At step S166 it is judged if the continuous error retransmission mode has been selected, i.e., if signal line 132a is at signal level "1". If the continuous error retransmission mode has been selected, i.e., if signal line 132a is signal level "1", then step S174 follows. If the continuous error retransmission mode is not selected as yet, i.e.,if signal line 132a is signal level "0", then step S168 follows.

Step S168 is a pre-procedure. At this step, a normal transmission mode is declared.

Step S170 is a normal image transmission step at which a signal of signal level "0" is outputted to signal lines 136d and 136c. Step S172 is an after-procedure.

At step S174 it is judged if the receiving station is provided with the continuous error retransmission function, which is judged based on a procedure signal (signal NSF) outputted on signal line 120a. In case the reception station is provided with the retransmission function, then step S176 follows. If not, step S188 follows.

At step S176 it is judged if the international communication button has been depressed, i.e., if signal line 134a is signal level "1". In case the button has been depressed, i.e.in case signal line 134a is signal level "1", then step S178 follows. Alternatively if the international communication button is not depressed as yet, i.e., if signal line 134a is signal level "0", then step S180 follows.

At step S178 it is judged if the facsimile apparatus concerned is a calling station, i.e., if the flag HASSIN is "1". In case of the calling station, i.e., in case the flag HASSIN is "1", then step S180 follows. If not, i.e., if the flag HASSIN is "0", then step S188 follows.

At step S180 transmission in the continuous error retransmission mode is selected. In particular, signal levels "1" and "0" are outputted to signal lines 136d and 136e, respectively.

Step S182 is a pre-procedure, at which image information transmission in the continuous error retransmission mode is declared by signal NSS.

At step S184 image information transmission is performed in the continuous error retransmission mode. While image information transmission is performed using an international communication network, an echo suppressor function termination tone EST is sent from the EST generating circuit 116 immediately before an image signal is sent. A signal NACK is also detected by the NACK signal detecting circuit 122. The retransmission start line number to be sent following the signal NACK is detected by the retransmission start line detecting circuit 124. Next, if an error retransmission is intended, a signal representative of the retransmission start line number is outputted onto signal line 136c to inform the encoder 110 of the retransmission start line number. The encoder 110 starts the image information retransmission from the retransmission start line number. Step S186 is an after-procedure.

At step S188 low speed transmission of image information is selected. In particular, signal levels "0" and "1" are outputted onto signal lines 136d and 136e, respectively. Step 190 is a pre-procedure, at which low speed transmission of image information is declared by signal DCS. At step S192 low speed transmission of image information is performed. Step S194 is an after-procedure.

In the above embodiment, if the error retransmission mode is selected for communication over an international communication network, low speed transmission of image information is controlled to be performed from the called station to the calling station. However, besides such control method an error retransmission in a half duplex (so-called stop-and-wait error retransmission mode) may be applied.

Furthermore, in the above embodiment although depression of the international communication button is detected to judge if communication is initiated, it is also possible to automatically judge initiation of an international communication by receiving initial identification signals NSF/CSI/DIS.

As seen from the foregoing description of the second embodiment of the present invention, prior to sending and receiving data, the facsimile apparatus concerned can discriminate by itself if it is a calling station or not. Therefore, it is possible to properly perform the succeeding transmission control procedure. For instance, if the error retransmission mode is selected for an international communication, data transmission from the calling station to the called station is performed in the error retransmission mode, while data transmission from the called station to the calling station is performed at low speed. Therefore, a disabled status in communication as conventional can be avoided even during data transmission from the called station to the calling station.

Next, a third embodiment of the present invention will be described.

First, a brief description of the operation will be given wherein the receiving station is provided with the continuous error retransmission function, the operator at the sending station has selected the retransmission mode, and the start button for international communication has been depressed.

In such a state, the sending station confirms by itself as to whether the sending station is a calling station or a called station, with the aid of calling station identification means and storing means for storing information whether the facsimile apparatus concerned is a called station, to be described later in detail. In the case that the sending station is a calling station, transmission of image information is performed in the continuous error retransmission mode. Declaration for transmission in the continuous error retransmission mode is effected by a signal NSS. Alternatively, in the case that the sending station is a called station, low speed transmission of image information is initiated. Declaration for this low speed transmission is effected by a signal DCS.

If the operator at the sending station has not selected the continuous error retransmission mode, a normal transmission of image information is performed. It is not relevant in this case whether the receiving station is provided with the continuous error retransmission function and whether the operator at the sending station has depressed the start button for international communication.

In the case that although the operator at the sending station has selected the continuous error retransmission mode, the receiving station is not provided with the continuous error retransmission function, low speed transmission of image information is initiated. It is not relevant in this case whether the operator at the sending station has depressed the start button for international communication.

In the case that the receiving station is provided with the continuous error retransmission function and that the operator at the sending station has selected the retransmission mode but not depressed the start button for international communication, transmission in the continuous error retransmission mode is performed.

The construction and operation of a third embodiment of the facsimile apparatus will be described in detail in the following.

Figure 6:
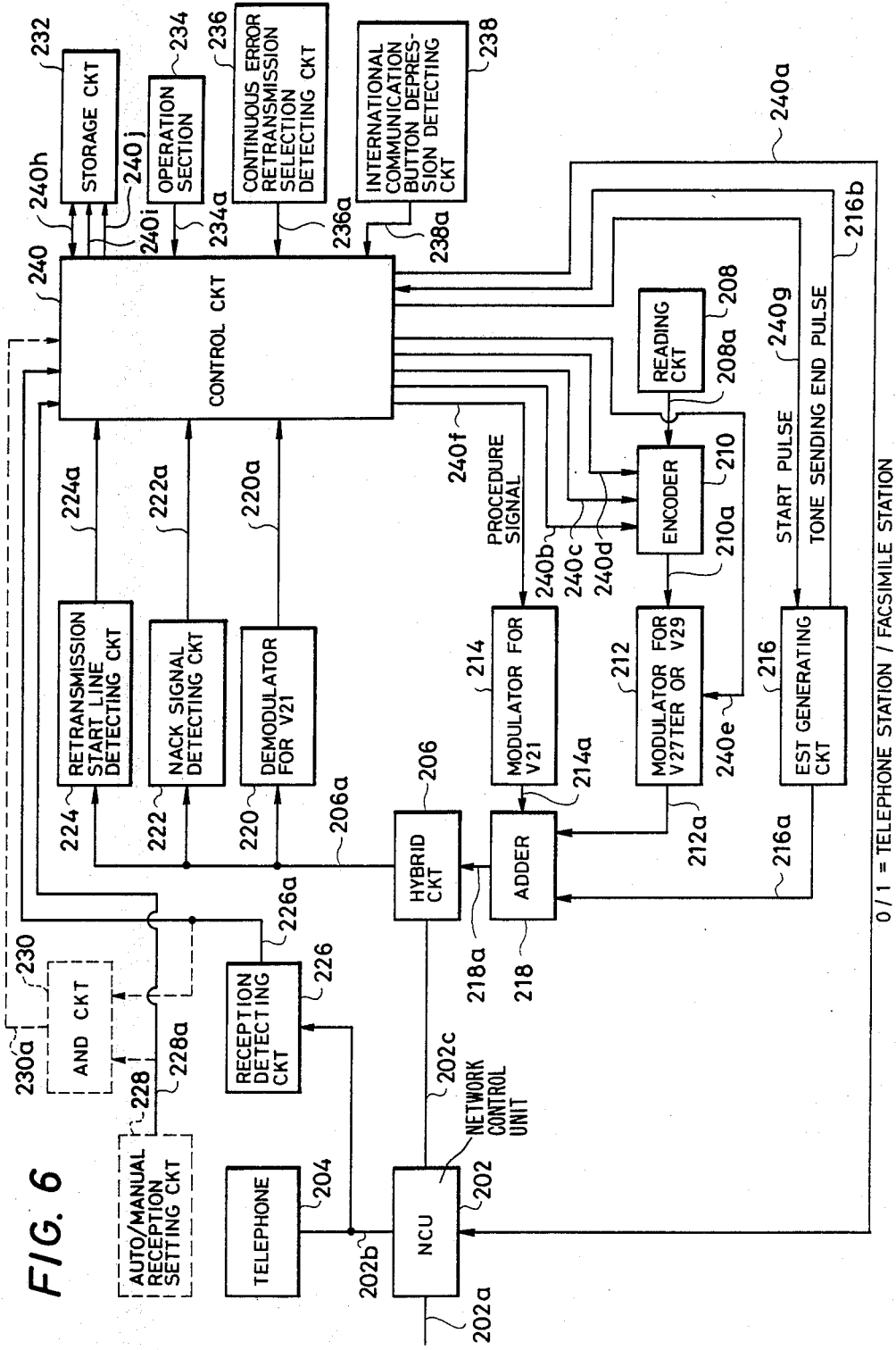
FIG. 6 is a block diagram showing a third embodiment of the facsimile apparatus to which the present invention is applied.

Referring now to FIG. 6, network control unit NCU 202 controls to connect a telephone station to a telephone network, connect a data communication path to the telephone network for using it as data communication, or hold a loop. Signal line 202a represents a telephone line. NCU 202 is inputted with a signal from signal line 240a and connects the telephone line to the telephone station, i.e., connects signal line 202a to signal line 202b, on condition that signal level "0" is inputted from signal line 240a. On the contrary if signal level "1" is inputted from signal line 240a, NCU 202 connects the telephone line to the facsimile station, i.e., connects signal line 202a to signal line 202c. In an ordinary state, the telephone line is maintained connected to the telephone station. Reference numeral 204 represents a telephone set.

A hybrid circuit 206 performs separation between sending signals and receiving signals. In particular, sending signals on signal line 218a are sent to the telephone network via signal line 202c and NCU 202. Receiving signals are delivered onto signal line 206a via NCU 202 and signal line 202c.

A reading circuit 208 sequentially reads from an original to be transmitted one-line image signals in the main scan direction and generates a signal train made of binary signals of white and black. The reading circuit 208 is constructed of an image sensor such as a charge-coupled device (CCD) and an optical system. The signal train binarized as of white and black is outputted to signal line 208a.

An encoder 210 is inputted with binarized data from signal line 208a and encodes it. The encoder 210 has a memory whose capacity is sufficient for retransmission purpose. The encoder 210 encodes the binarized data so as to be suitable for ordinary transmission in case that signal level "0" is inputted from signal line 240d, while on the other hand it encodes the binarized data so as to be suitable for continuous error retransmission in case that signal level "1" is inputted from signal line 240d. During the continuous error retransmission mode, the following control is performed. When signal line 240b takes signal level "1", image transmission is interrupted. If signal line 240b becomes signal level "0", information at the retransmission start line outputted onto signal line 240c is inputted to the encoder circuit 210 which in turn retransmits information starting from the start line. Data subjected to MH (Modified Huffman) encoding, MR (Modified Read) encoding or error retransmission encoding is outputted onto signal line 210a.

A modulator 212 performs modulation in conformity with known CCITT Recommendation V27 ter (differential phase modulation) or V29 (orthogonal modulation). The modulator 212 is inputted with a signal from signal line 210a and modulates it to output modulated data onto signal line 212a. If signal line 240e is signal level "0", high speed transmission of modulated data is performed for example at 9600 bit/sec of V29. Alternatively if signal line 240e is signal level "1", low speed transmission of modulated data is performed for example at 4800 bit/sec of V27 ter.

A modulator 214 performs modulation in conformity with known CCITT Recommendation V21, which is inputted with a procedure signal from signal line 240f and modulates it to output modulated data onto signal line 214a.

An echo suppressor function termination tone generating circuit or EST generating circuit 216 generates a signal EST onto signal line 216a when a pulse appears on signal line 240g. In this embodiment, as a signal EST, a signal of 2100 Hz continues to be sent for one second. The EST generating circuit 216 generates a tone delivery end pulse onto signal line 216b when delivery of a signal ESP is completed.

An adder 218 is inputted with signals from signal lines 212a, 214a and 216a and outputs the added result onto signal line 218a.

A demodulator 220 performs demodulation in conformity with known CCITT Recommendation V21, which is inputted with a signal from signal line 206a and V21-demodulates it to output a demodulated signal onto signal line 220a.

A NACK signal detecting circuit 222 is inputted with a signal from signal line 206a and generates a pulse onto signal line 222a when it detects a signal NACK sent from the receiving station.

A retransmission start line detecting circuit 224 detects the retransmission start line number to be sent following a signal NACK, and outputs the line number onto signal line 224a.

A reception detecting circuit 226 is inputted with a signal from signal line 202b. When it detects a calling signal of 16 Hz, the reception detecting circuit 226 outputs a signal of signal level "1".

An auto/manual reception setting circuit 228 can be set as desired by an operation section 234 to be described later. If a manual reception mode is set, the circuit 228 outputs a signal of signal level "0" onto signal line 228a. If an auto reception mode is set, it outputs a signal of signal level "1" onto signal line 228a.

An AND circuit 230 is inputted with signals from signal lines 226a and 228a and outputs its result onto signal line 230a. In contrast, according to the conventional facsimile apparatus, the signal on signal line 230a is inputted to a control circuit as a reception signal. In other words, a reception is confirmed on condition that an auto reception mode is set and a calling signal of 16 Hz is received. However, according to the facsimile apparatus of this embodiment, the signal on signal line 226a is directly inputted to the control circuit as a reception signal. Therefore, even if a manual reception mode is set, the facsimile apparatus can detect by itself a reception. In this case, an audible ringing of the telephone is generated with the telephone network connected to signal line 202b.

A storage circuit 232 functions to store information whether the facsimile apparatus is a called station In particular, to write the information on whether the facsimile apparatus is a called station, data (a signal of level "1" for a called station, and a signal of level "0" for a calling station) is outputted onto signal line 240h and thereafter a write pulse is generated onto signal line 240j. Contrary, to read the information on whether the facsimile apparatus is a called station, the data is read via signal line 240h after generating a read pulse onto signal line 240i.

The operation section 234 includes such as a start key, mode setting key, numerical keys, alphabetical keys, one-touch keys, and the like. The information signal inputted from the operation section 234 is outputted onto signal line 234a.

A continuous error retransmission selection detecting circuit 236 detects if the operator has selected the retransmission mode. The circuit 236 outputs signal level "0" onto signal line 236a in case that the operator does not select as yet the continuous error retransmission mode. On the contrary, if the operator selects the retransmission mode, the circuit 236 outputs signal level "1" onto signal line 236a.

An international communication button depression detecting circuit 238 detects if the operator has depressed the button. The circuit 238 outputs a signal of level "0" onto signal line 238a in case that the button is not depressed as yet. On the contrary, if the button is depressed by the operator, the circuit 238 outputs a signal of level "1" onto signal line 238a.

The control circuit 240 performs the following controls. The description is made assuming that a calling is received and a connection for facsimile transmission has been established.

First, if a calling is established, it is discriminated if the facsimile apparatus concerned is a called station. The discrimination information is stored in the storage circuit 232 for storing information on whether the apparatus is a called station. Such a procedure is carried out in both automatic and manual reception modes.

In case that the receiving station is provided with the continuous error retransmission function, and that the operator at the sending station has selected the retransmission mode and has depressed the start button for international communication, the sending station discriminates if it is a calling station or a called station. If it is a calling station, transmission in the continuous error retransmission mode is performed. Alternatively, if it is a called station, low speed transmission of image information is initiated.

If the operator at the sending station has not selected the continuous error retransmission mode, a normal transmission of image information is performed. It is not relevant in this case whether the receiving station is provided with the continuous error retransmission function and whether the operator at the sending station has depressed the start button for international communication.

In the case that although the operator at the sending station has selected the continuous error retransmission mode, the receiving station is not provided with the continuous error retransmission function, low speed transmission of image information is initiated. It is not relevant in this case whether the operator at the sending station has depressed the start button for international communication.

In the case that the receiving station is provided with the continuous error retransmission function and that the operator at the sending station has selected the retransmission mode but not depressed the start button for international communication, transmission in the continuous error retransmission mode is performed.

Declaration for transmission of image information in the continuous error retransmission mode is effected by a signal NSS, while declaration for low speed transmission of image information is effected by a signal DCS. The control circuit 240 is constructed of such as a CPU, ROM, RAM and the like.

Figure 7A:
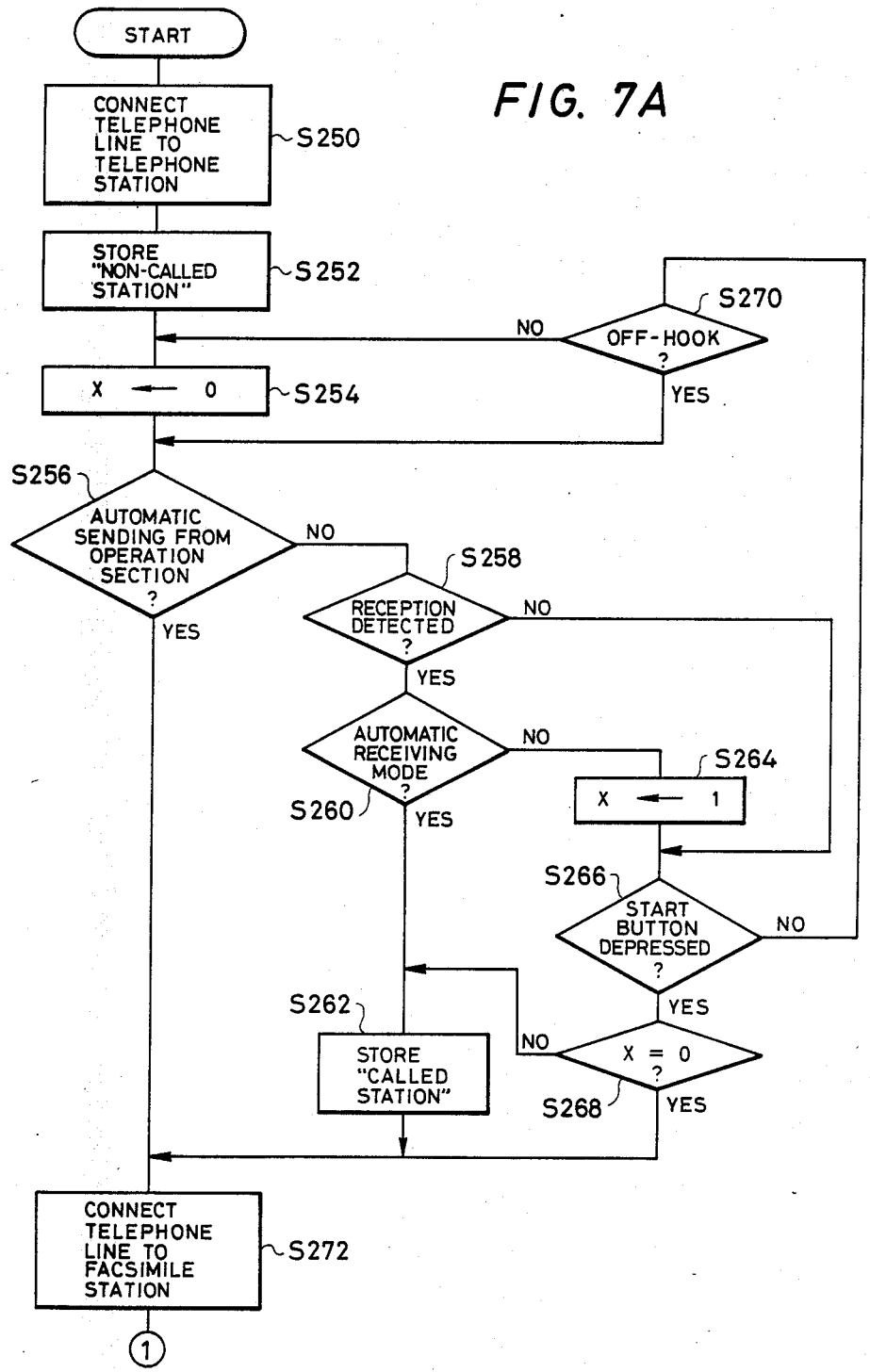

In FIGS. 7A and 7B, flow charts for the control procedure of the control circuit 240 of FIG. 6 are shown. The content of these flow charts is stored in the ROM of the control circuit 240.

Referring now to FIG. 7A, the telephone network is connected to the telephone station at step S250. That is, a signal of level "0" is outputted onto signal line 240a.

From step S252 to step S270, if it is judged as a sending station at the auto/manual network connection, a signal of level "0" (indicative of non-called station) is written in the storage circuit 232 for storing information on whether the facsimile apparatus is a called station. Alternatively, if the facsimile apparatus is a called station, a signal of level "1" (indicative of called station) is written in the storage circuit 232 for storing information on whether the facsimile apparatus is a called station.

First, at step S252 a signal of level "0" (indicative of non-called station) is written in the storage circuit 232 for storing information on whether the facsimile apparatus is a called station. In the case that an auto reception mode is set (which is decided by the input signal from signal line 228a) and when a reception is detected (when an auto reception is detected), information that the facsimile apparatus is a called station is stored (a signal of level "1" is written in the storage circuit 232 for storing information on whether the apparatus is a called station) to thereafter advance to step S272.

When a reception is detected (which is decided by the input signal from signal line 226a), "1" is set at a flag X which is set with "0" at the time of initialization and on-hook state.

A manual operation starts when the start button is depressed. After depression of the start button, the content of the flag X is checked. If the content of the flag X is "1", the facsimile apparatus is judged as a receiving station and such information is stored (a signal of level "1" is written in the storage circuit 232 for storing information on whether the apparatus is a called station) to thereafter advance to step S272.

If the content of the flag X is "0" under depression of the start button, it is judged that the apparatus is a sending station. Also, in the case an automatic sending is performed by the operation unit 234, the apparatus is judged as a sending station to advance thereafter to step S272.

At step S272 the telephone network is connected to the facsimile station, i.e., a signal of signal level "1" is outputted onto signal line 240a.

At step S274 shown in FIG. 7B, it is judged if the continuous error retransmission mode has been selected, i.e., if signal line 236a is at signal level "1". If the continuous error retransmission mode has been selected, i.e., if signal line 236a is signal level "1", then step S282 follows. If the continuous error retransmission mode is not selected as yet, i.e., if signal line 236a is signal level "0", then step S276 follows.

Step S276 is a pre-procedure. At this step, a normal transmission mode is declared by the signal NSS/DCS. Step S278 is a normal image transmission step at which a signal of signal level "0" is outputted to signal lines 240d and 240e. Step S280 is an afterprocedure.

At step S282 it is judged if the reception station is provided with the continuous error retransmission function, which is judged based on a procedure signal (signal NSF) outputted on signal line 220a. In case the reception station is provided with the retransmission function, then step S292 follows. If not, step S284 follows.

At step S284, low speed transmission of image information is selected. In particular, signal levels "0" and "1" are outputted onto signal lines 240d and 240e, respectively. Step S286 is a pre-procedure, at which low speed transmission of image information is declared by a signal DCS. At step S288 low speed transmission of image information is performed. Step S290 is an afterprocedure.

At step S292, it is judged if the international communication button has been depressed, i.e., if signal line 238a is signal level "1". In case the international communication button has been depressed, i.e., signal line 238a is signal level "1", then step S294 follows. Alternatively, if the international communication button is not still depressed, i.e., signal line is signal level "0", then step S296 follows.

At step S294, it is judged if the facsimile apparatus concerned is a called station, based on the input data from the storage circuit 232 for storing information on whether the apparatus is a called station. In case of the calling station, then step S284 follows. If not, then step S296 follows.

At step S296 transmission in the continuous error retransmission mode is selected. In particular, signal levels "1" and "0" are outputted to signal lines 240d and 240e, respectively.

Step S298 a pre-procedure, at which image information transmission in the continuous error retransmission mode is declared by signal NSS.

At step S300 image information transmission is performed in the continuous error retransmission mode.

While image information transmission is performed using an international communication network, an echo suppressor function termination tone EST is sent from the EST generating circuit 216 immediately before an image signal is sent. A signal NACK is also detected by the NACK signal detecting circuit 222. The retransmission start line number to be sent following the signal NACK is detected by the retransmission start line detecting circuit 224. Next, if an error retransmission is intended, a signal representative of the retransmission start line number is outputted onto signal line 240c to inform the encoder 210 of the retransmission start line number. The encoder 210 starts the image information retransmission from the retransmission start line number. Step S302 is an after-procedure.

In the above embodiment, if the error retransmission mode is selected for communication over an international communication network, low speed transmission of image information is controlled to be performed from the called station to the calling station. However, besides such control method an error retransmission in a half duplex (so-called stop-and-wait error retransmission mode) may be applied.

Furthermore, in the above embodiment although depression of the international communication button is detected to judge if communication is initiated, it is also possible to automatically judge initiation of an international communication by receiving initial identification signals NSF/CSI/DIS.

As seen from the foregoing description of the third embodiment of the present invention, prior to sending and receiving data, the facsimile apparatus concerned can discriminate by itself if it is a calling station or not. Therefore, it is possible to properly perform the succeeding transmission control procedure. For instance, if the error retransmission mode is selected for an international communication, data transmission from the calling station to the called station is performed in the error retransmission mode, while data transmission from the called station to the calling station is performed at low speed. Therefore, a disabled status in communication as conventional can be avoided even during data transmission from the called station to the calling station As seen from the foregoing description of the present invention, data communication in a full duplex mode is possible. For instance, in case a reception error occurs during data communication, a continuous error retransmission mode informing the sending station of such effect can be effected using a conventional telephone network.

The present invention is not intended to be limited to the above embodiments, but various applications and modifications are possible within the scope of the appended claims.

What is claimed is:

1. A data communication apparatus, comprising:
   data communication means for performing a data communication;
   pre-procedure means for performing a pre-procedure for the data communication;
   interpage procedure means for performing, in a case where data communication of data corresponding to plural pages is performed by said data communication means, a procedure or the data communication every time communication of a page of data is completed; and
   stop signal sending means for sending a stop signal to stop and echo suppressor function on a communication network immediately before the data communication, in order to execute a communication in the pre-procedure and an interpage procedure in a half duplex mode and to execute the data communication in a full duplex mode.

2. A data communication apparatus according to claim 1, wherein said stop signal is sent in a case where said data signal is sent in a continuous error retransmission mode.

3. A data communication apparatus according to claim 1, wherein the stop signal is sent from a sending side.

4. A data communication apparatus according to claim 3, wherein the stop signal is sent immediately before sending of a training signal, the training signal being sent prior to a data signal, for training a reception apparatus.

5. A data communication apparatus according to claim 1, wherein said data signal includes image information.

6. A data communication apparatus according to claim 1, further comprising:
   discrimination means for discriminating whether said data communication apparatus is a calling station or a called station; and
   control means for controlling such that said full duplex communication mode is selected to send the data signal when said data communication is determined to be the calling station, and said half duplex communication mode is selected to send the data signal when said data communication apparatus is discriminated to be the called station.

7. A data communication apparatus according to claim 6, wherein said full duplex communication mode includes a continuous error retransmission mode.

8. A data communication apparatus according to claim 6, wherein said discrimination means performs discrimination prior to sending and receiving said data signal.

9. A data communication apparatus according to claim 6, wherein said data signal includes image information.

10. A data communication apparatus according to claim 1, wherein the data communication in said full duplex mode includes communication by continuous error retransmission.

11. A data communication apparatus according to claim 1, wherein data of the data communication includes image signal data.

12. A data communication apparatus, comprising:
    first means for sending a communication procedure signal via a communication network;
    second means for sending a data signal via the communication network;
    third means for sending, via the communication network, a training signal for training a reception apparatus prior to sending of the data signal;
    fourth means for sending, via the communication network, a stop signal which includes a stop instruction for stopping an echo suppressor function on the communication network; and;
    fifth means for receiving an error detection signal from the reception apparatus during the data signal sending of said second means,
    wherein the stop signal is sent prior to the training signal sending by said third means, and a time interval between the training signal and the stop signal is set to be within a time required for restoring said echo suppressor function.

13. A data communication apparatus according to claim 12, wherein the stop signal is sent after said data communication apparatus receives from the reception apparatus a signal which indicates that preparation for signal reception at the reception apparatus is complete.

14. A data communication apparatus according to claim 12, wherein the data signal includes image information.

15. A data communication apparatus according to claim 12, further comprising retransmission means for re-sending the data signal when the error detection signal is received by said fifth means, and wherein said third means re-sends the training signal prior to the data signal re-sending by said retransmission means and said fourth means re-sends the stop signal immediately before the training signal re-sending by said third means.

* * * * *

UNITED STATES PATENT AND TRADEMARK OFFICE
CERTIFICATE OF CORRECTION

PATENT NO. : 4,885,755
DATED : December 5, 1989
INVENTOR(S) : TAKEHIRO YOSHIDA

It is certified that error appears in the above-identified patent and that said Letters Patent is hereby corrected as shown below: ON TITLE PAGE:

AT [56] REFERENCES CITED

Line 6, "3,979,559 7/1976 Roedel et al." should read --3,979,559 9/1976 Roedel et al.--.

COLUMN 10

Line 14, "calling" should read --call--.
    Line 18, "calling" should read --call--.
    Line 35, "calling" should read --call--.
    Line 53, "136c." should read --136e.--.

COLUMN 17

Line 64, "or" should read --for--.
    Line 68, "and" should read --an--

COLUMN 18

Line 62, "and;" should read --and--.

Signed and Sealed this

Twenty-fifth Day of February, 1992

*Attest:*

HARRY F. MANBECK, JR.

*Attesting Officer*      *Commissioner of Patents and Trademarks*